Figure 1:
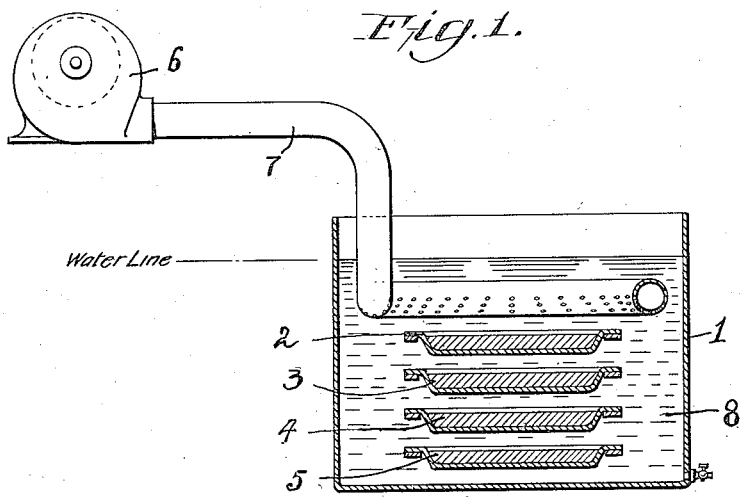

H. P. SCOTT AND W. G. BOND.
PROCESS FOR PURIFYING AIR.
APPLICATION FILED JULY 23, 1915.

1,379,221. Patented May 24, 1921.

UNITED STATES PATENT OFFICE.

HENRY P. SCOTT AND WILLIAM G. BOND, OF WILMINGTON, DELAWARE.

PROCESS FOR PURIFYING AIR.

1,379,221.  Specification of Letters Patent.  Patented May 24, 1921.

Application filed July 23, 1915. Serial No. 41,458.

*To all whom it may concern:*

Be it known that we, HENRY P. SCOTT and WILLIAM G. BOND, citizens of the United States, and residents of Wilmington, in the county of New Castle and State of Delaware, have invented certain new and useful Improvements in Processes for Purifying Air, of which the following is a specification.

Our invention relates to a process whereby carbon dioxid ($CO_2$) may be removed from air and the full, or if desired a part of the oxygen equivalent thereof may be returned thereto.

Our invention is particularly intended to regenerate and purify air in closed chambers, a mine, the interior of a sub-marine vessel, a crowded school room or office, a bank vault, etc., in which the air is more or less rapidly vitiated by the breathing of the occupants or by the operation of machinery that may be therein installed.

In carrying out our process we employ two oxygen compounds which we may submerge in a liquid, water for instance, and as these compounds will in general, if brought into direct contact with one another while in the liquid, be rapidly decomposed releasing their oxygen we separate them in order that this condition may not ensue.

The oxygen compounds that we employ are of two different types, one of the per-acids, per-acid salts, or oxids of the form $XO_2$, capable of forming hydrogen peroxid with an acid, carbonic acid for instance. This we will term type 1, the other capable of releasing oxygen equivalent to $O_2$ when reacting with hydrogen peroxid, which we will designate as type 2. We do not desire to confine our invention to these particular combinations as they are illustrative of one process only.

Supposing that we employ barium peroxid as the oxygen compound of type 1 and submerge this material in water into which is passed $CO_2$, the reaction will be as follows:—

$$BaO_2 + H_2O + CO_2 = BaCO_3 + H_2O_2$$

and if the oxygen compound of type 2 be lead dioxid, the reaction will be carried further thus:

$$PbO_2 + H_2O_2 = H_2O + PbO + O_2.$$

from which it will be seen that the oxygen equivalent to that contained in the $CO_2$ is released.

Should the full oxygen equivalent of the $CO_2$ be not required the hydrogen peroxid could be decomposed by catalytic action thus:—

$$H_2O_2 + MnO_2 = MnO_2 + H_2O + O.$$

In carrying out our invention the air containing the $CO_2$ is driven by suitable means, a pump or fan for instance, into the water in which the oxygen compounds of types 1 and 2 are submerged, the $CO_2$ being absorbed by the type 1 compound, as shown above, the product of which absorption reacting with the type 2 compound resulting in releasing free oxygen equivalent to that contained in the $CO_2$, *i. e.*, $O_2$.

Our process is also capable of absorbing many other gases such as chlorin and hydrogen sulfid, and by its powerful oxidizing properties is capable of oxidizing others such as carbon monoxid into carbon dioxid thus bringing about the subsequent absorption of the carbon monoxid.

In the accompanying drawings, Figure 1 is a sectional side elevation of an apparatus for carrying out our invention, and Fig. 2 a graphic representation of the curves obtained in the experiment hereinafter described.

In Fig. 1,—1 is a vessel containing water in which is immersed a nest of shelves 2—4 and 3—5 one on top of the other, the former two containing barium peroxid and the latter two lead dioxid. The pans are so disposed that these two substances do not come into direct contact the one with the other. 6 is a fan or pump for driving the vitiated air through a conduit 7 into the liquid 8 in which the chemicals are immersed.

Figure 2:
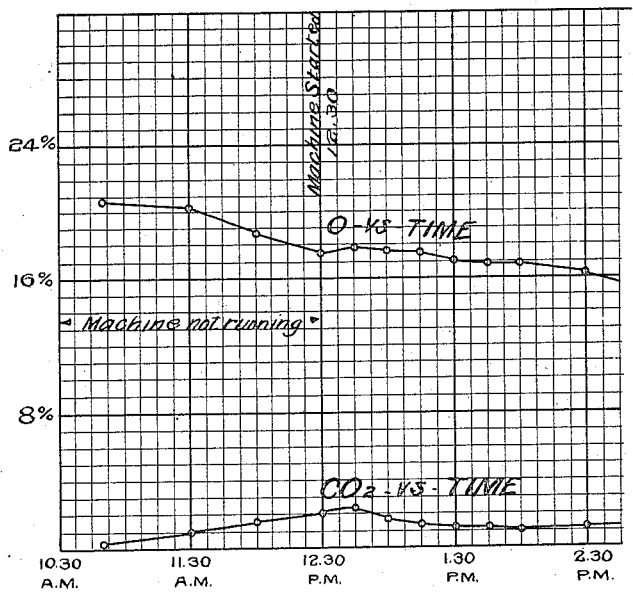

In Fig. 2 is shown graphically the result of an experiment as follows:—

A man was placed in an absolutely air-tight chamber completely surrounded by water. The inside dimensions of this box were 3′ x 4′ x 6′, and in addition to the man contained an apparatus for analyzing the air, an electric motor, a fan and one apparatus for regenerating the air. For the first two hours the apparatus was not running, and from the drawing it will be seen that the oxygen was steadily decreasing while the carbon dioxid was steadily increasing. Analyses of the air were made at half hour intervals simultaneously by the man within and an observer outside the box. After two hours, at 12.30 o'clock, the machine was started and the oxygen and $CO_2$ lines between 12.30 and 2.30 o'clock p. m. show graphically that the former was almost immediately raised and the latter lowered during the first hour's operation of the machine and that thereafter these lines were practically parallel showing that for all practical purposes there was no appreciable increase of $CO_2$, or loss of oxygen.

In Fig. 2 the hours are indicated by the large squares which are divided longitudinally and vertically by lines into squares indicating longitudinally, eighths of an hour and vertically percentages of O and $CO_2$.

Having thus described our invention we claim as new and desire to secure by Letters Patent:—

1. The process of regenerating air containing carbon dioxid, which consists in supporting two separate oxygen compounds within a body of water, passing the vitiated air through said water, the introduction of the carbon dioxid initiating chemical reaction which alters the oxygen content of each of said compounds and restores to the air as free oxygen an equivalent amount to that contained in the carbon dioxid.

2. The process of regenerating air containing carbon dioxid, which consists in supporting two separate oxygen compounds within a body of water, passing the vitiated air through said water, the introduction of the carbon dioxid initiating chemical reaction which alters the oxygen content of one of the oxygen compounds to produce a product which subsequently reacts with the other compound to automatically maintain the oxygen content of the air at a constant figure.

3. The process for regenerating and purifying air containing carbon dioxid which consists in passing the vitiated air into a body of water in which are immersed two oxygen compounds, the first of which forms with carbonic acid a peroxid compound which reacts with the second, releasing oxygen.

4. The described process for regenerating and purifying air containing carbon dioxid which consists in passing the vitiated air into a body of water in which are immersed two oxygen compounds, the first of which forms a soluble peroxid compound with carbonic acid, which reacts with the second compound releasing oxygen equivalent to the oxygen in the carbon dioxid.

5. The method of maintaining air respirable, which comprises reacting on the carbon dioxid in vitiated air in a suitable solution with a substance capable of combining with the carbon dioxid to release oxygen to said solution, and then releasing the oxygen from the solution.

6. The method of maintaining the oxygen content of air substantially constant which comprises reacting on the carbon dioxid in vitiated air in a suitable solution with a substance capable of releasing oxygen when combining with the carbon dioxid which initiates the process and then reacting upon the solution with an oxygen compound capable of releasing oxygen from the solution.

7. The method of maintaining the oxygen content of air substantially constant, which comprises reacting on the carbon dioxid in vitiated air in a suitable solution with a substance capable of releasing oxygen to said solution, when combining with the carbon dioxid and then reacting upon the solution with an oxygen compound to release the same volume of oxygen as required for the production of the carbon dioxid reacted upon.

8. A step in the process of absorbing the carbon and releasing oxygen by action of carbon dioxid, which consists in combining the oxygen with hydrogen to produce $H_2O_2$ and subsequently reacting with the $H_2O_2$ with an oxygen compound capable of releasing oxygen.

9. The process of maintaining air respirable which consists in passing the partially vitiated air through a solution of an oxygen compound capable of reacting with carbon dioxid in the presence of water to form hydrogen peroxid, then reacting on said hydrogen peroxid with another oxygen compound capable of reducing said hydrogen peroxid to water by freeing oxygen therefrom.

10. The process of maintaining air respirable which consists in passing the partially vitiated air through a solution of an oxygen compound capable of reacting with carbon dioxid in water to form hydrogen peroxid, then reacting on said hydrogen peroxid with another oxygen compound capable of reducing said hydrogen peroxid to water and setting free oxygen equivalent in amount to the oxygen content of the carbon dioxid treated.

11. The process of regenerating air containing carbon dioxid which consists in liberating oxygen from a solution by chemical reaction that is initiated by the introduction of the carbon dioxid.

12. The process of regenerating air containing carbon dioxid which consists in liberating oxygen from a solution by chemical reaction that is initiated by the introduction of the carbon dioxid and ultimately releasing oxygen in proportion to the oxygen present in the carbon dioxid.

HENRY P. SCOTT.
WILLIAM G. BOND.

Witnesses:
THEO. W. TRIGGS,
WILLIAM F. O'KEEFE.